United States Patent
Mistry et al.

(10) Patent No.: US 8,614,990 B1
(45) Date of Patent: Dec. 24, 2013

(54) WIRELESS DEVICE HANDOFF BASED UPON DYNAMIC FACTORS

(75) Inventors: Hetal J. Mistry, Herndon, VA (US); PinalKumari K. Tailor, Ashburn, VA (US); Esmail Hejazi Dinan, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1128 days.

(21) Appl. No.: 12/324,179

(22) Filed: Nov. 26, 2008

(51) Int. Cl.
*H04W 4/00* (2009.01)
*H04B 7/00* (2006.01)
*H04W 36/00* (2009.01)

(52) U.S. Cl.
USPC ............ 370/332; 370/331; 370/310; 455/437

(58) Field of Classification Search
USPC .................................. 370/331, 310; 455/437
See application file for complete search history.

(56) References Cited

U.S. PATENT DOCUMENTS

| | | |
|---|---|---|
| 5,422,933 A | 6/1995 | Barnett et al. |
| 6,507,740 B2 | 1/2003 | Shi |
| 6,754,493 B1 | 6/2004 | Jetzek |
| 8,060,095 B1 * | 11/2011 | Gerami ........................ 455/437 |
| 2002/0102977 A1 | 8/2002 | Shi |
| 2005/0221828 A1 | 10/2005 | Wakuta et al. |
| 2006/0268756 A1 * | 11/2006 | Wang et al. ................... 370/310 |
| 2007/0002799 A1 * | 1/2007 | Hunzinger .................... 370/331 |
| 2009/0022107 A1 * | 1/2009 | Kapoor et al. ................ 370/331 |
| 2009/0059861 A1 * | 3/2009 | Gunnarsson et al. ......... 370/331 |
| 2009/0168725 A1 * | 7/2009 | Mishra .......................... 370/331 |

* cited by examiner

*Primary Examiner* — Ian N Moore
*Assistant Examiner* — Kiet Tang

(57) ABSTRACT

What is disclosed is a method of coordinating a handoff of a wireless communication device from a first access node to a second access node. The method includes monitoring a signal strength level at the wireless communication device for wireless communications transferred from each of the first access node and the second access node. The method also includes determining a loading factor of the first access node, a loading factor of the second access node, a mobility factor of the wireless communication device, and an application type of user communications between the wireless communication device and the first access node, and processing the loading factor of the first access node, the loading factor of the second access node, the mobility factor, and the application type to determine a handoff threshold. The method also includes coordinating the handoff of the wireless communication device from the first access node to the second access node based on the handoff threshold, wherein the handoff is initiated when a difference between the signal strength levels reaches the handoff threshold.

18 Claims, 6 Drawing Sheets

WIRELESS DEVICE HANDOFF BASED UPON DYNAMIC FACTORS

TECHNICAL FIELD

Aspects of the disclosure are related to the field of communications, and in particular, wireless communication device handoff between access nodes in wireless communication networks.

TECHNICAL BACKGROUND

Wireless communication systems often include access nodes through which wireless communication devices transfer user communications. In many examples of wireless communication systems, each of the wireless communication devices can typically transfer user communications through only one access node at a time. Therefore, as the signal strength of communications between a wireless communication device and an associated access node decreases, the wireless communication device may desire to transfer user communications through a different access node with a potential for higher signal strength for communications.

The process of a wireless communication device transferring from one access node to another is typically referred to as a handoff. A handoff can occur when a wireless communication device detects a higher signal strength from an access point other than the access point through which the wireless communication device is presently communicating. The wireless communication device could then seek to initiate a handoff to the access point with the higher signal strength.

OVERVIEW

What is disclosed is a method of coordinating a handoff of a wireless communication device from a first access node to a second access node. The method includes monitoring a signal strength level at the wireless communication device for wireless communications transferred from each of the first access node and the second access node. The method also includes determining a loading factor of the first access node, a loading factor of the second access node, a mobility factor of the wireless communication device, and an application type of user communications between the wireless communication device and the first access node, and processing the loading factor of the first access node, the loading factor of the second access node, the mobility factor, and the application type to determine a handoff threshold. The method also includes coordinating the handoff of the wireless communication device from the first access node to the second access node based on the handoff threshold, wherein the handoff is initiated when a difference between the signal strength levels reaches the handoff threshold.

What is also disclosed is a communication system. The communication system includes a wireless communication device configured to seek a handoff from a first access node to a second access node. The wireless communication device is configured to monitor a signal strength level at the wireless communication device for wireless communications transferred from each of the first access node and the second access node. The first access node is configured to determine a loading factor of the first access node, a loading factor of the second access node, a mobility factor of the wireless communication device, and an application type of user communications between the wireless communication device and the first access node, and process the loading factor of the first access node, the loading factor of the second access node, the mobility factor, and the application type to determine a handoff threshold. The first access node is also configured to coordinate the handoff of the wireless communication device from the first access node to the second access node based on the handoff threshold, wherein the handoff is initiated when a difference between the signal strength levels reaches the handoff threshold.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
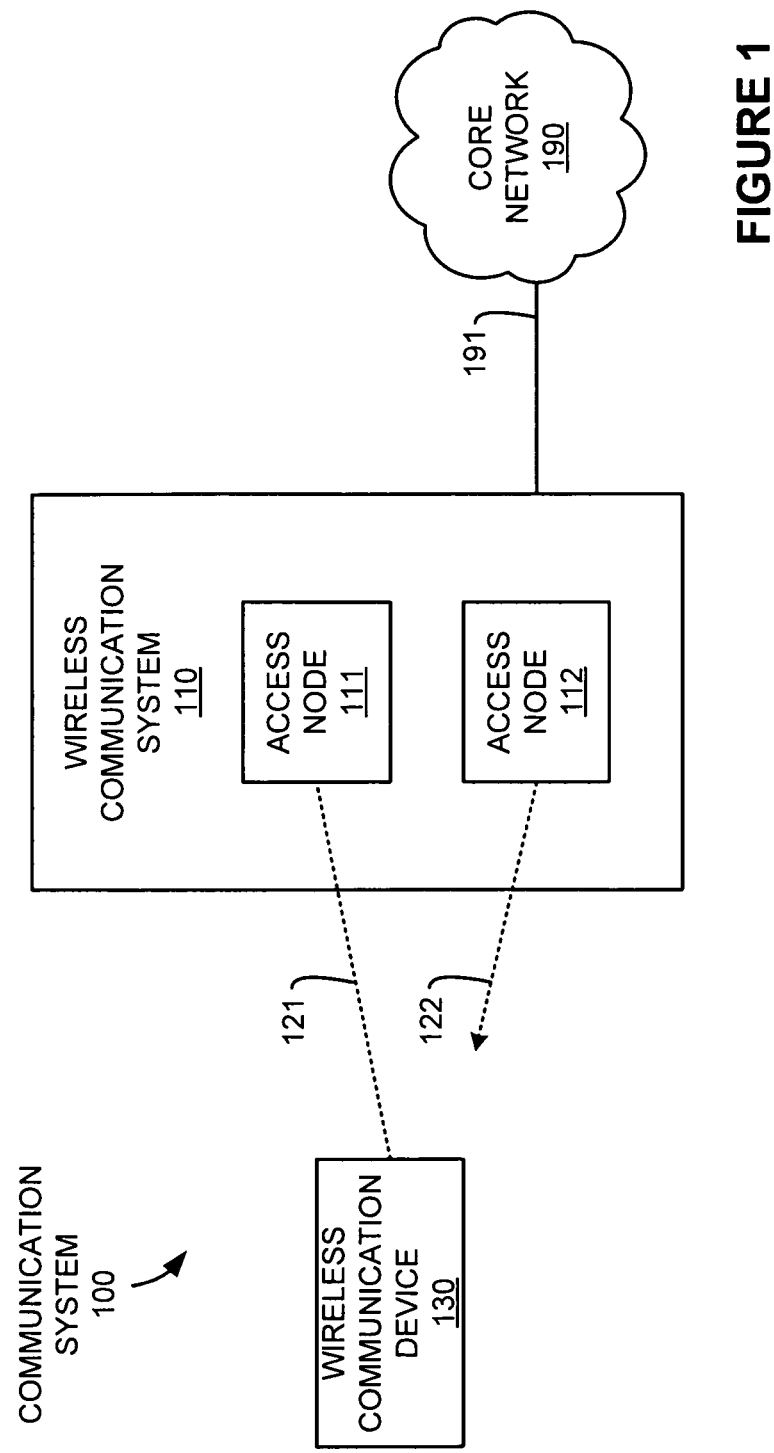
FIG. 1 is a system diagram illustrating a communication system.

FIG. 1 is a system diagram illustrating communication system 100. Communication system 100 includes wireless communication system 110, wireless communication device 130, and core network 190. Wireless communication system 110 and core network communicate over link 191.

Wireless communication system 110 includes access node 111 and access node 112. As shown in FIG. 1, wireless communication system 110 and wireless communication device 130 are initially configured to communicate over wireless link 121 through access node 111. Wireless communication system 110 and wireless communication device 130 can also be configured to communicate over wireless link 122 through access node 112, as indicated by the arrowhead on wireless link 122. It should be understood that a different number of access nodes, or other associated equipment, could be included in wireless communication system 110.

Further examples of wireless communication system 110 can include radio node controllers (RNC), packet data serving nodes (PDSN), deep packet inspection (DPI) equipment, subscriber profile systems (SPS), authentication, authorization, and accounting (AAA) equipment, home agents, data centers, accounting and billing systems, mobile switching centers, call processing equipment, wireless access nodes, wireless access points, telephone switches, Internet routers, network gateways, as well as other type of communication equipment—including combinations thereof.

Access nodes 111-112 include wireless communications equipment capable of communicating with wireless communication device 130. Examples of access nodes 111-112 can include base stations, base transceiver stations, boomer stations, antennas, radio node controllers (RNC), call processing equipment, wireless access points, Internet routers, network gateways, as well as other type of communication equipment—including combinations thereof. Although only access nodes 111-112 are shown in FIG. 1, it should be understood that in other examples more access nodes could be in wireless communication system 110.

Wireless communication device 130 comprises a telephone, transceiver, computer, digital assistant, smart phone, Internet appliance, or some other wireless communication apparatus—including combinations thereof. Although only wireless communication device 130 is shown in FIG. 1, it should be understood that in other examples more wireless communication devices could be in communication with wireless communication system 110.

Core network 190 could include an Internet network, wireless network, telephony network, optical network, enterprise network, local area network, or some other type of communication network or communication equipment—including combinations thereof.

Wireless links 121-122 use various communication media, such as air, space, or some other wireless transport media—including combinations thereof. Wireless links 121-122 use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless links 121-122 may comprise many different signals sharing the same link. Wireless links 121-122 could include multiple signals operating in a single "airpath"—as represented by the dashed lines in FIG. 1—comprising beacon signals, user communications, communication sessions, overhead communications, frequencies, timeslots, transportation ports, logical transportation links, network sockets, packets, or communication directions. For example, user communications between wireless communication device 130 and access node 111 could share the same representative wireless link 121, but be transferred over different communication sessions, frequencies, timeslots, packets, ports, sockets, logical transport links, or in different directions—including combinations thereof.

Link 191 uses various communication media, such as air, space, metal, optical fiber, or some other signal propagation path—including combinations thereof. Link 191 could be wired or wireless and use various communication protocols such as Internet, Internet protocol (IP), local-area network (LAN), optical networking, hybrid fiber coax (HFC), telephony, T1, or some other communication format—including combinations or variations thereof. Link 191 could be a direct link or might include various equipment, intermediate components, systems, and networks. Link 191 could include multiple signals operating in a single pathway in a similar manner as wireless links 121-122.

Figure 2:
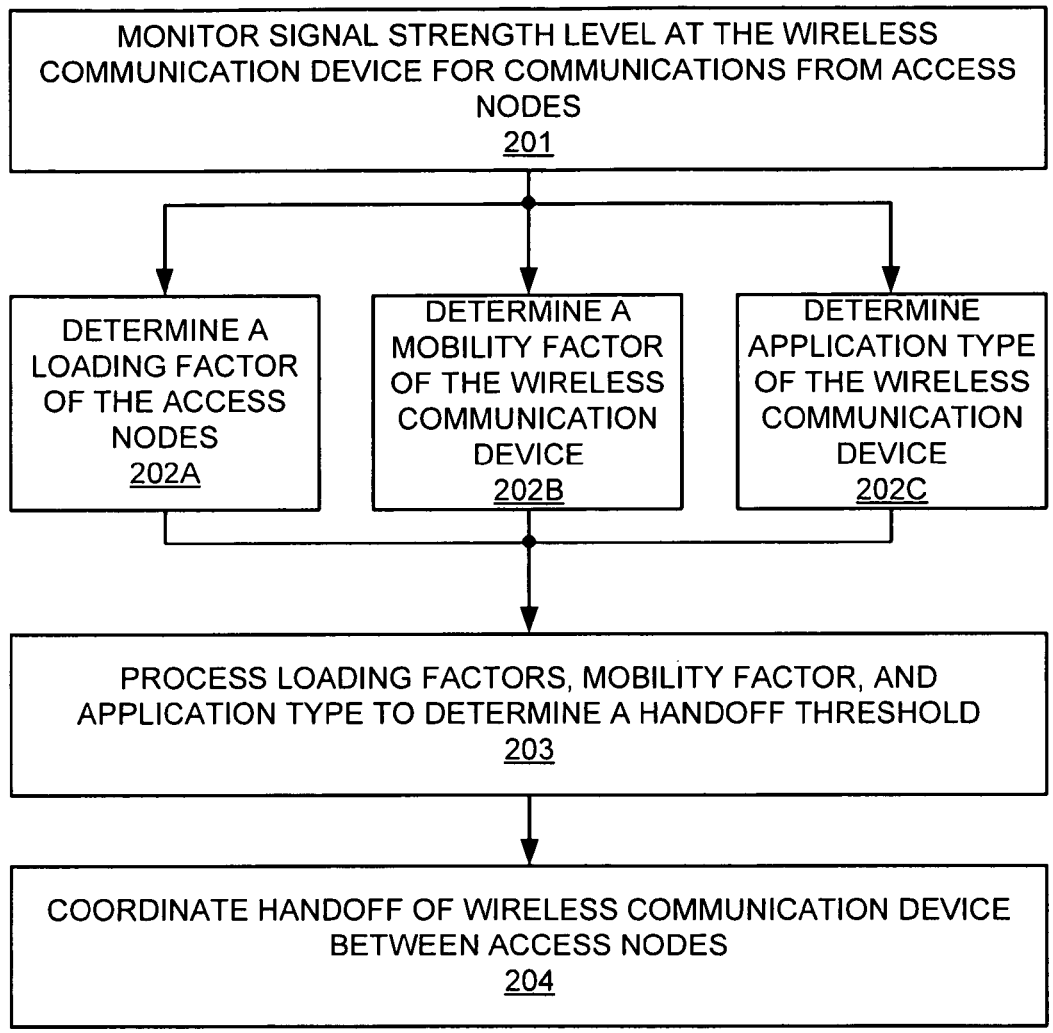
FIG. 2 is a flow diagram illustrating a method of operation of a communication system.

FIG. 2 is a flow diagram that illustrates an example method of operation of communication system 100, as found in FIG. 1. The phases shown in FIG. 2 are indicated herein parenthetically.

In FIG. 2, a signal strength level of communications from each of access nodes 111-112 is monitored (201) at wireless communication device 130. The signal strength level could be determined by monitoring user communications, overhead communications, a beacon signal, pilot signal, or other communications transferred from access nodes 111-112.

Since, in the example shown in FIG. 1, wireless communication device 130 initially exchanges user communications over link 121 with access node 111, a determination of signal strength level of communications from access node 111 could be determined from the user communications over link 121.

Also, as shown in the example illustrated in FIG. 1, wireless communication device 130 is not yet registered with or attached to access node 112, and thus not yet exchanging user communications with access node 112. Therefore, wireless communication device 130 could monitor communications transferred by access node 112 that are broadcast or generally accessible from access node 112. In examples where a generally accessible or broadcast communications are monitored, a beacon signal, pilot signal, or other communications, could be monitored.

In some examples, wireless communication device 130 monitors the signal level of communications from access nodes 111-112. Wireless communication device 130 could then wirelessly transfer an indication of the signal levels to wireless communication system 110. In other examples, access node 111 or access node 112 monitor communications transferred from wireless communication device 130 to determine a signal strength level of communications received at access nodes 111-112. These signal strength levels of communications from wireless communication device 130 could then be processed to determine an associated or estimated signal strength level of communications transferred from access nodes 111-112, but at wireless communication device 130. In further examples, wireless communication device 130 transfers the indicator of a signal strength levels for communications associated with access nodes 111-112 over a channel quality indicator channel.

A loading factor of access node 111 (202A), a loading factor of access node 112 (202A), a mobility factor of wireless communication device 130 (202B), and an application type of user communications between wireless communication device 130 and access node 111 (202C) are determined.

A loading factor is an indication of the level of loading of a particular access node, such as access node 111. In some examples, the loading factor represents a number of wireless communication devices associated with, attached to, or in communication with a particular access node. In other examples, the loading factor represents a traffic level of the particular access node, where the traffic level could represent all data traffic through the particular access node, a specific type of traffic through an access node, or other measures of traffic level. For example, the particular access node could be heavily loaded if many wireless communication devices are associated with and communicating with the access node, or the access node could be heavily loaded if relatively few wireless communication devices are associated with the access node, but those wireless communication devices are each communicating a high level of data traffic through the access node.

A mobility factor is an indication of the motion of a wireless communication device, such as wireless communication device 130. In some examples, the mobility factor indicates a velocity, speed, or direction of travel of a wireless communication device, while in other examples, the mobility factor indicates a rate of change of a location of a wireless communication device. For example, if the wireless communication device is moving slowly, the mobility factor could be low, while if the wireless communication device is moving quickly, the mobility factor could be high. In other examples, if the relative distance between the wireless communication device and associated access node are not changing much, the mobility factor could be low, while if the relative distance between the wireless communication device and associated access node changes frequently, the mobility factor could be high.

An application type comprises a user service or user communications as implemented in communications transferred between a wireless communication device, such as wireless communication device 130, and the associated access node, such as access node 111, or other networks, such as core network 190. The user services, for example, could include Internet communications, voice calls, telephony, video, audio, email, text, chat data, web pages, peer-to-peer (P2P) communications, Voice over IP (VoIP), as well as other data and application types—including combinations thereof. The application could also be distinguished among different application service providers, even though such application service providers are providing similar types of user services. For example, although Voice over IP (VoIP) is a type of user service, various application service providers, could also be distinguished from each other, much like the individual user services. It should also be understood that certain applications may require a larger data bandwidth to transfer than others, for example, video may require a larger bandwidth than email or text.

In further examples, other factors could be processed to determine a handoff threshold. For example, a service level agreement of wireless communication device 130, the loading of other access nodes in wireless communication system 110, the activities of other wireless communication devices in wireless communication system 110, or other factors could be considered. In examples where the activities of other wireless communication devices are considered, multiple wireless communication devices may be accessing the similar user content or communicating the same application types, and it would be advantageous to keep such wireless communication devices exchanging user communications with the same access node due to similarity of content, localized caching of data at an access node, or other concerns.

The loading factors, mobility factor, and application type are then processed (203) to determine a handoff threshold. A handoff threshold could indicate a signal strength level upon which to initiate a handoff from one access node to another. For example, as shown in FIG. 1, wireless communication device 130 is initially associated with access node 111. Access node 111 is then referred to as the serving access node. Over time, the signal strength level, at wireless communication device 130, of communications from access node 111 may change. If the signal strength level changes to a lower level, wireless communication device may seek to associate with another access node, such as access node 112—referred to as the target access node, to ensure consistent and high quality communications through wireless communication system 110 to other networks, such as core network 190. In some examples, this handoff threshold represents a signal strength level of communications received from access node 111. In other examples, the signal strength level of communications received from both access node 111 and 112 are considered, and a difference between the signal strength levels comprises the handoff threshold.

To determine the handoff threshold, loading factors, mobility factor, and application type are processed (203). The result of the processing could indicate a threshold signal strength level, at wireless communication device 130, of communications from the serving access node, such as access node 111, where if reached, a handoff would be initiated. In other examples, the result of the processing could indicate a threshold difference in signal strength level, at wireless communication device 130, of communications from both the serving access node and a target access node, such as access node 112.

The handoff of wireless communication device 130 from access node 111 to access node 112 is then coordinated (204) based on the handoff threshold. The handoff threshold represents a trigger to initiate a handoff process from serving access node 111 to target access node 112. In many examples, the handoff is initiated when a difference between signal strength levels of access node 111 and access node 112 reaches the handoff threshold.

The handoff coordination could include, in some examples, access node 111 transferring an indicator of the handoff to access node 112. Access node 112 could then receive the indicator of the handoff and initiate further user communications between wireless communication device 130 and access node 112. Access node 111 would then discontinue user communications between wireless communication device 130 and access node 111. In some examples, an indicator could then be transferred from access node 112 to access node 111 to indicate the transfer was successful.

In other examples, wireless communication device 130 could receive information related to the available access nodes for handoff. Then, after processing the handoff threshold and associated factors as discussed above, wireless communication device 130 could transfer an indicator of the handoff to access node 111. Access node 111 could then respond to the indicator of the handoff, and wireless communication device 130 could initiate communications with a selected one of the available access node for handoff, such as access node 112. Access node 112 could then coordinate the initiation of user communications between access node 112 and wireless communication device 130, and the handoff would be completed.

Advantageously, loading factors, a mobility factor, and an application type are processed to determine a handoff threshold, instead of a raw signal strength level of communications from access node 111 or access node 112 to initiate a handoff. User communications that are sensitive to loading levels of access nodes, mobility of wireless communication device 130, or of a particular application type could then receive a higher quality of service and better user experience, due to the handoff from one access node to another coordinated according to the factors mentioned herein.

For example, wireless communication device 130 could be exchanging user communications through access node 111 of an application type requiring a high bandwidth, such as exchanging video content with core network 190. A handoff threshold, taking into account the application type along with the loading factors of the serving and target access nodes, could be determined. When the signal strength level between communications from access node 111 and access node 112 reaches the threshold level, a handoff between access node 111 and access node 112 could be coordinated. The handoff threshold processing, as detailed herein, could ensure quality video transfer between wireless communication device 130 and core network 190. For example, if the loading of access node 112 is high, the handoff threshold may be tailored based upon loading factors, mobility factor, and application type to keep wireless communication device 130 associated with access node 111 over a larger signal strength level range than would be without considering the factors. Wireless communication device 130 could then experience better video transfer from access node 111 than from access node 112, until conditions reach a point favorable to initiate a handoff to access node 112.

Another example may include a handoff from an access node that has a high signal strength level to an access node that has a low signal strength level. For example, after processing the factors discussed herein, including the loading factors, mobility factor, and application type, wireless communication system 110 may determine an appropriate handoff threshold to transition wireless communication device 130 from an access node with a high loading factor to an access node with a low loading factor, even through the access node with the high loading factor may have a higher signal strength at wireless communication device 130. This transition could also occur if the mobility factor indicates relative motion of wireless communication device 130 toward the access node with the lower signal strength level. In such an example, a highly loaded access node could more quickly handoff wireless communication devices to other access nodes to alleviate a high loading condition.

Furthermore, wireless communication system 110 could consider the loading of all access nodes, and work to optimize the loading between the various access nodes to achieve a higher level of performance for all wireless communication devices communicating through wireless communication system 110. Advantageously, by considering the factors as discussed herein, more efficient use of the resources of wireless communication system 110 could be obtained.

Figure 3:
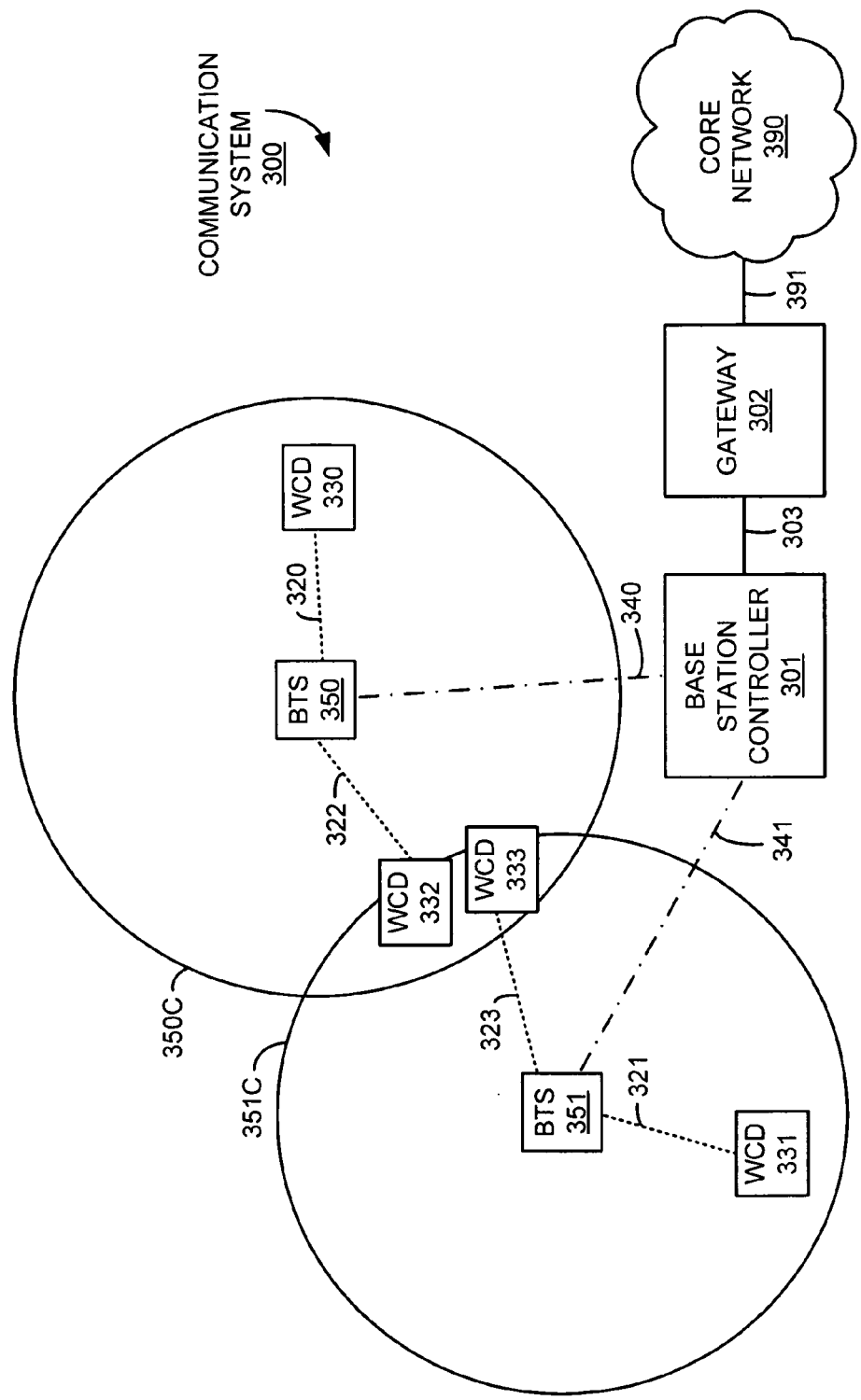
FIG. 3 is a system diagram illustrating a communication system.

FIG. 3 is a system diagram illustrating communication system 300. Communication system 300 includes base station controller 301, gateway 302, core network 390, base transceiver stations (BTS) 350-351, and wireless communication devices (WCD) 330-333. Base station controller 301 and BTS 350 communicate over link 340. Base station controller 301 and BTS 351 communicate over link 341. Base station controller 301 and gateway 302 communicate over link 303. Gateway 302 and core network 390 communicate over link 391. BTS 350 and WCD 330 communicate over wireless link 320. BTS 350 and WCD 332 communicate over wireless link 322. BTS 351 and WCD 331 communicate over wireless link 321. BTS 351 and WCD 333 communicate over wireless link 323.

WCD 330-333 each comprise a telephone, transceiver, computer, digital assistant, smart phone, Internet appliance, or some other wireless communication apparatus—including combinations thereof.

BTS 350-351 include base station equipment, antennas, transceivers, and other equipment for communicating with and controlling WCD 330-333. BTS 350-351 could also include other types of communications network equipment capable of communicating with WCD 330-333.

Communication system 300 shows BTS 350-351 each situated in a separate circular region of coverage 350C and 351C, respectively, although in some examples a different number or configuration of base transceiver stations may be included. The circular shape should be understood to be merely symbolic of an overhead view of a region of wireless coverage, and should not be interpreted as an exact physical representation of such a region.

In many examples, a region of coverage is served by a single antenna, antenna tower, or BTS. Wireless communication devices can be located throughout the regions of coverage. Although WCD 330-333 are shown in FIG. 3, it should be understood that in various examples of communication system 300, a different number of wireless communication devices could be located in and distributed throughout the various regions of coverage of communication system 300. Also, as shown in FIG. 3, WCD 330 and WCD 331 are located within a single coverage area, while WCD 332 and WCD 333 are located in an overlapping area served by two coverage areas.

Base station controller 301 is configured to monitor and control the operations of BTS 350-351—in this example, BTS 350-351 are operated by the same service provider as base station controller 301. Examples of base station controller 301 can include radio node controllers (RNC), subscriber profile systems (SPS), authentication, authorization, and accounting (AAA) equipment, as well as other type of communication equipment—including combinations thereof.

Gateway 302 acts as a gateway for communications between wireless communication devices within the various coverage areas of communication system 300 and core network 390. Examples of gateway 302 can include access service network gateways (ASN-GW), mobile switching controllers (MSC), packet data serving nodes (PDSN), call processing equipment, home agents, wireless access points, Internet routers, network gateways, systems as well as other types of communication equipment—including combinations thereof.

Core network 390 includes a core network of the service provider in this example, comprising an Internet network, local area networks, and other telecommunications equipment and networks. In some examples, core network 390 acts as a gateway for communications between gateway 302 and further wireless communication systems, the Internet, or telephony systems.

In this example, link 303 comprises an IP networking connection, links 340-341 each comprise a T1 connection, and link 391 comprises an optical networking connection. Wireless links 320-323 each comprise a wireless link operating using the WiMAX protocol in this example.

Figure 4:
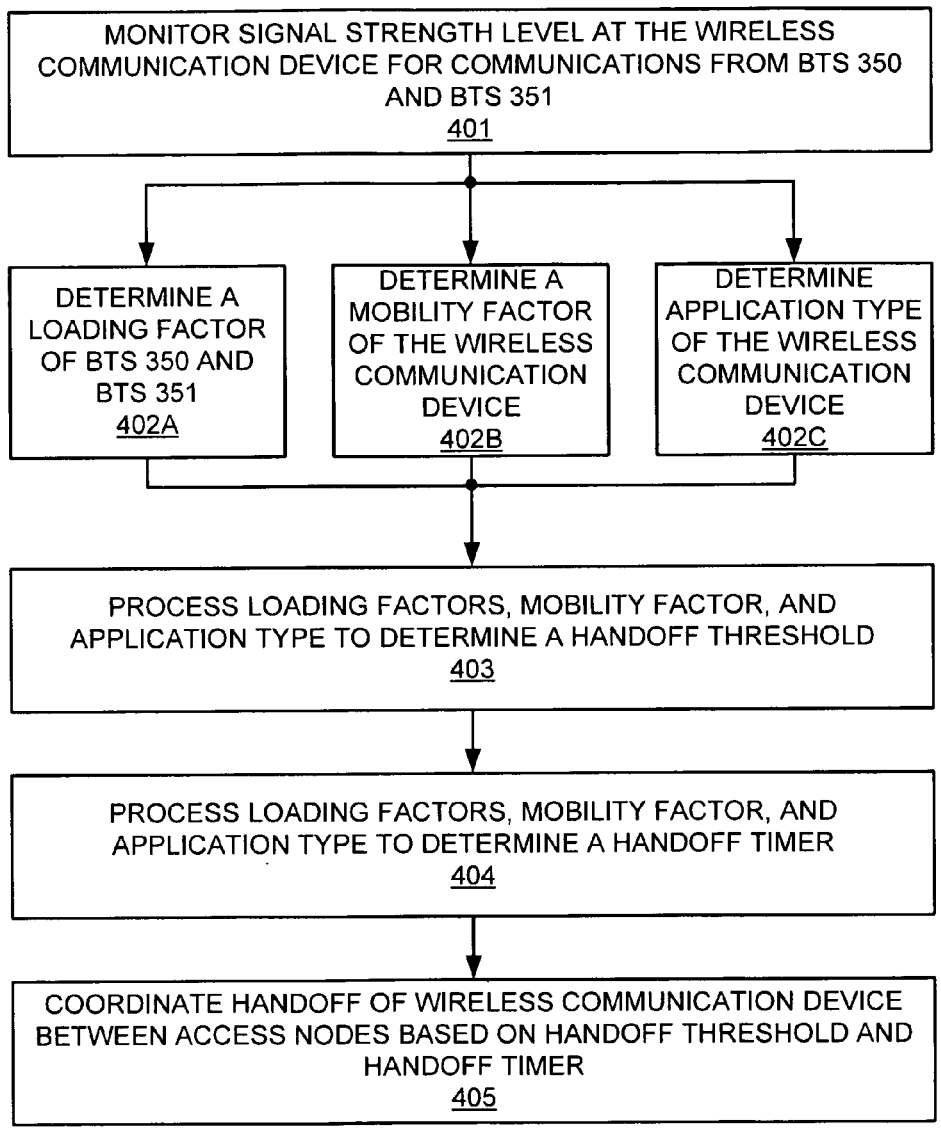
FIG. 4 is a flow diagram illustrating a method of operation of a communication system.

FIG. 4 is a flow diagram illustrating an example method of operation of communication system 300, as found in FIG. 3. The phases shown in FIG. 4 are indicated herein parenthetically.

In FIG. 3, coverage areas 350C and 351C overlap in a region where WCD 332 and WCD 333 are located. Therefore, WCD 332 and WCD 333 are possible candidates for handoff to a different BTS. In this example, WCD 332 is initially attached to BTS 350 over wireless link 322 and WCD 333 is initially attached to BTS 351 over wireless link 323. In this example, a handoff from BTS 350 to BTS 351 of WCD 332 will be discussed. A similar process could occur for WCD 333 with respect to a handoff from BTS 351 to BTS 350.

WCD 332 detects signal strength levels of BTS 350 and BTS 351, and these signal strength levels are monitored (401). In some examples, WCD 332 monitors these signal strength levels, while in other examples the serving BTS, BTS 350, monitors these signal strength levels. WCD 332 could transfer the signal strength levels to BTS 350. As discussed above, the signal strength levels could be monitored for user communications, overhead communications, beacon signals, pilot channels, or other communications.

BTS 350 determines a loading factor of BTS 350 (402A), a loading factor of BTS 351 (402A), a mobility factor of WCD 332 (402B), and an application type of user communications between WCD 332 and BTS 350 (402C).

Figure 5:
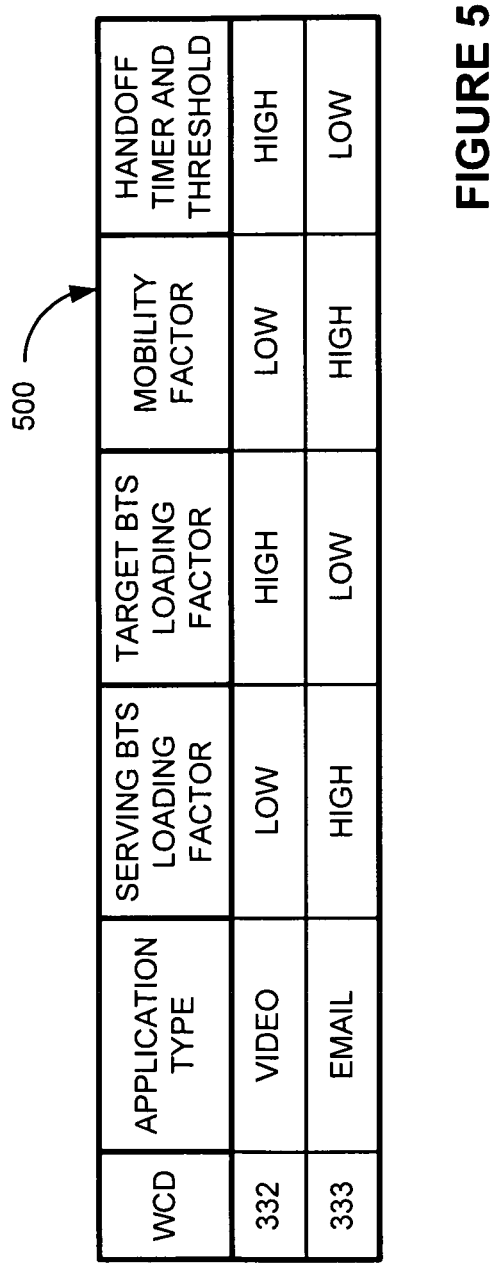
FIG. 5 is a table illustrating example handoff parameters.

An example of the loading factors, mobility factors, and application type are illustrated table 500, as found in FIG. 5. In table 500, WCD 332 has an application type of video, a low serving BTS loading factor, a high target BTS loading factor, and low mobility factor. In this example, for WCD 332, the serving BTS is BTS 350 and the target BTS is BTS 351. A further example is shown for WCD 333 in table 500, however in this example, the serving BTS is BTS 351 and the target BTS is BTS 350 for WCD 333.

BTS 350 then processes (403) the loading factors, mobility factor, and application type to determine a handoff threshold. BTS 350 also processes (404) the loading factors, mobility factor, and application type to determine a handoff timer.

A handoff timer could indicate a delay to wait to initiate a handoff from one access node to another. For example, as shown in FIG. 3, WCD 332 is initially associated with BTS 350. Over time, the signal strength level, at WCD 332, of communications from BTS 350 may change. If the signal strength reaches the handoff threshold, WCD 332 may seek to associate with another BTS, such as BTS 351, to ensure consistent and high quality communications to other networks, such as core network 390. However, in addition to the handoff threshold, a handoff timer delay may be determined before WCD 332 is allowed to participate in a handoff from BTS 350 to BTS 351. The handoff timer may be used to further ensure quality communications as well as prevent overloading of the various BTS, or frequent and unnecessary handoffs, among other conditions. For example, if the signal strength levels fluctuate rapidly, WCD 332 may attempt to handoff repeatedly and quickly between BTS 350 and BTS 351. Advantageously, a handoff timer would delay the handoff to enforce a hysteresis on the handoff process and ensure unnecessary handoffs would not occur as frequently. Additionally, the application type, loading factors, or mobility factor could play a role in the handoff timer. For example, if the application type indicated a time-sensitive application, such as video, the communication activity of WCD 332 may see a benefit from remaining on the same BTS for a longer timeframe than indicated by a handoff threshold alone.

An example of the handoff timer and threshold are shown in table 500, as found in FIG. 5. In table 500, the handoff timer and threshold are 'high' for WCD 332, and 'low' for WCD 333. In some examples, the handoff threshold could correspond to a signal strength level in decibels, volt-meters, or other indication of signal strength level. Likewise, the handoff timer could correspond to a time in seconds, a number of cycles of a wireless link, or other indication of time delay.

BTS 350 then coordinates (405) the handoff of WCD 332 from BTS 350 to BTS 351 based on the handoff threshold and the handoff timer. An example of the handoff process is illustrated in graph 600 as found in FIG. 6.

Figure 6:
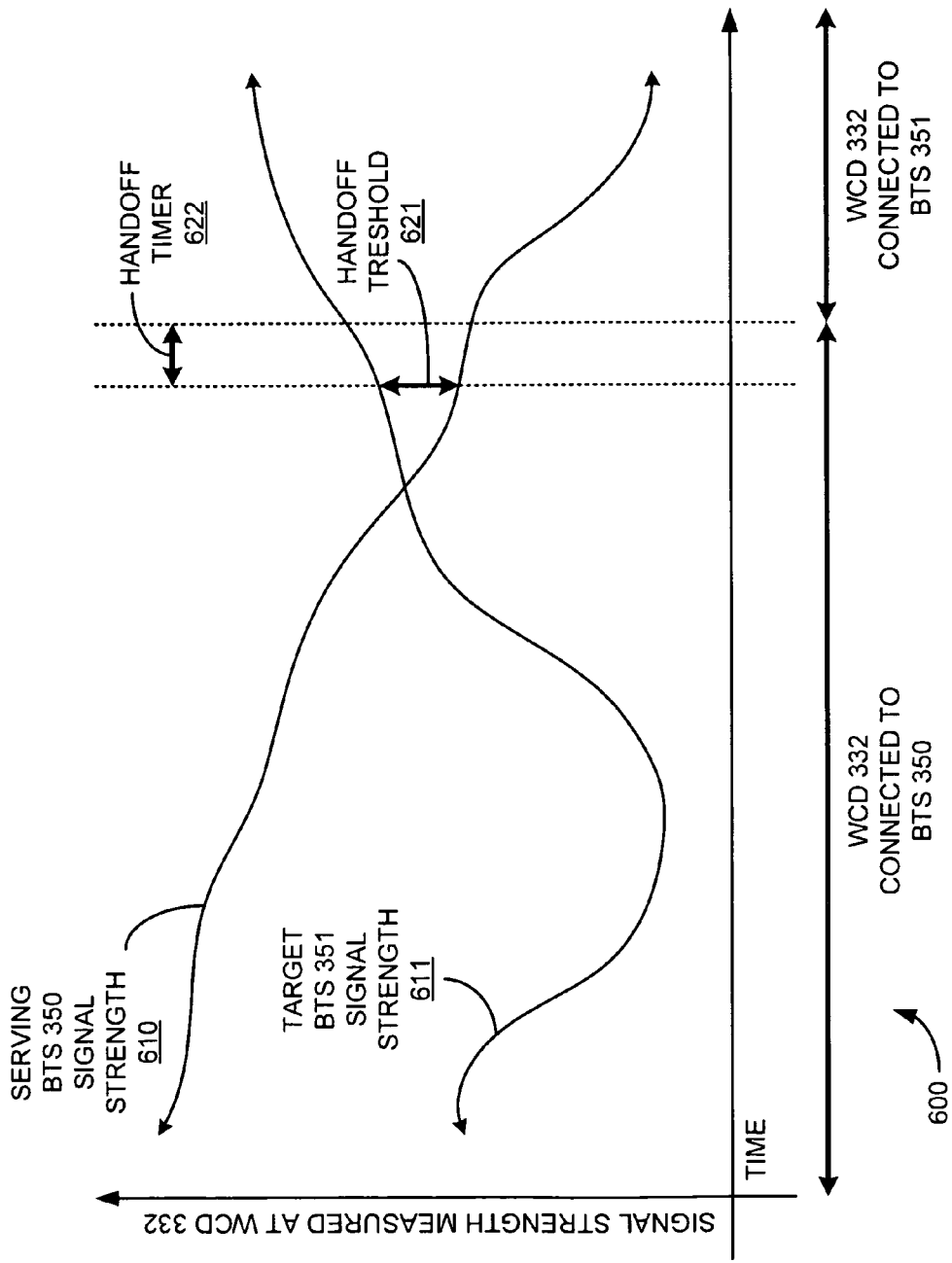
FIG. 6 is a graph illustrating an example handoff sequence.

As shown in FIG. 6, graph 600 includes two axes, a horizontal axis representing increasing time, and a vertical axis representing signal strength as measured at WCD 332. Curve 610, representing the signal strength of serving BTS 350, and curve 611, representing the signal strength of target BTS 351, are also shown in graph 600.

As shown in graph 600, the signals strengths of BTS 350 and BTS 351, as measured by WCD 332, can change over time. As the signal strength of BTS 350 decreases, WCD 332 may desire to change to a different BTS to ensure continued or quality wireless communications. For example, BTS 351 has increasing signal strength, possibly due to WCD 332 moving away from BTS 350 and towards BTS 351, and could be a candidate as a target BTS for handoff.

However, instead of initiating a handoff from BTS 350 to BTS 351 based solely on a signal strength difference between the two BTS, the processes described herein are employed to determine handoff threshold 621 based upon loading factors of BTS 350 and BTS 351, a mobility factor of WCD 332, an application type, or other factors of communications with WCD 332. Handoff threshold 621 indicates a difference in signal strength, as measured at WCD 332, between BTS 350 and BTS 351 for a handoff to be initiated.

Furthermore, handoff timer 622 is employed, based upon loading factors of BTS 350 and BTS 351, a mobility factor of WCD 332, an application type, or other factors of communications with WCD 332, which could delay the handoff process by a period of time as discussed herein.

Once handoff threshold 621 is reached and handoff timer 622 is reached, a handoff is coordinated for WCD 332 to transition from receiving user communications from BTS 350 to receiving user communications from BTS 351. The timing of the handoff process is illustrated below the horizontal axis of graph 600, as the two arrowed lines indicating the time during which WCD 332 is connected to BTS 350 and the time WCD 332 is connected to BTS 351.

It should be understood that although, in the examples discussed above for FIG. 4, BTS 350 performs the operations in phases 402A-402C and 403-405, in other examples WCD 350, base station controller 301, or other systems could do so, including combinations thereof.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of coordinating a handoff of a wireless communication device from a first access node to a second access node, the method comprising:
   monitoring, by the first access node, a signal strength level at the wireless communication device for wireless communications transferred from each of the first access node and the second access node;
   determining, by the first access node, a loading factor of the first access node, a loading factor of the second access node, a mobility factor of the wireless communication device, and an application type of user communications between the wireless communication device and the first access node;
   processing, by the first access node, a service level agreement of the wireless communication device in combination with the loading factor of the first access node, the loading factor of the second access node, the mobility factor of the wireless communication device, and the application type of user communications between the wireless communications device and the first access node to determine a handoff threshold;
   coordinating, by the first access node, the handoff of the wireless communication device from the first access node to the second access node based on the handoff threshold, when a difference between the signal strength levels reaches the handoff threshold;
   initiating, at the first access node, a handoff timer after the signal strength levels reach the handoff threshold and the handoff of the wireless communication device from the first access node to the second access node is coordinated; and
   performing the handoff of the wireless communication device from the first access node to the second access node when the handoff timer expires.

2. The method of claim 1, further comprising determining a handoff timer duration such that the handoff timer expires when the handoff timer duration has elapsed, wherein determining the handoff timer duration comprises processing the loading factor of the first access node, the loading factor of the second access node, the mobility factor, and the application type.

3. The method of claim 2, wherein determining the handoff timer duration further comprises processing the service level agreement of the wireless communication device.

4. The method of claim 1, wherein monitoring the signal strength level at the wireless communication device for the wireless communications transferred from each of the first access node and the second access node comprises receiving, from the wireless communication device, an indicator of the signal strength levels of the first access node and the second access node, and coordinating the handoff of the wireless communication device from the first access node to the second access node based on the handoff threshold comprises determining the difference between the signal strength levels and comparing the difference between the signal strength levels to the handoff threshold.

5. The method of claim 1, wherein monitoring the signal strength level at the wireless communication device for the wireless communications transferred from each of the first access node and the second access node comprises estimating the signal strength levels at the wireless communication device for the wireless communications transferred from each of the first access node and the second access node.

6. The method of claim 1, wherein the loading factor of the first access node and the loading factor of the second access node each comprise a quantity of other wireless communication devices associated with each of the first access node and the second access node.

7. The method of claim 1, wherein the loading factor of the first access node and the loading factor of the second access node each comprise a traffic level of user communications of other wireless communication devices associated with each of the first access node and the second access node.

8. The method of claim 1, wherein the mobility factor of the wireless communication device comprises a rate of change of a location of the wireless communication device.

9. The method of claim 1, wherein coordinating the handoff of the wireless communication device from the first access node to the second access node based on the handoff threshold comprises:

transferring, by the first access node, an indicator of the handoff to the second access node;

receiving, by the second access node, the indicator of the handoff and initiating further user communications between the wireless communication device and the second access node; and discontinuing, by the first access node, user communications with the wireless communication device.

10. A communication system, comprising:
a first access node; and
a second access node;
wherein the first access node is configured to:
receive from a wireless communication device a signal strength level at the wireless communication device for wireless communications transferred from each of the first access node and the second access node;
determine a loading factor of the first access node;
determine a loading factor of the second access node;
determine a mobility factor of a wireless communication device in communication with the first access node;
determine an application type of user communications between the wireless communication device and the first access node;
process a service level agreement of the wireless communication device in combination with the loading factor of the first access node, the loading factor of the second access node, the mobility factor of the wireless communication device, and the application type of user communications between the wireless communication device and the first access node to determine a handoff threshold;

coordinate a handoff of the wireless communication device from the first access node to the second access node based on the handoff threshold, when a difference between the signal strength levels reaches the handoff threshold;

initiate a handoff timer after the difference between the signal strength levels reaches the handoff threshold and the handoff of the wireless communication device from the first access node to the second access node is coordinated; and performing the handoff of the wireless communication device from the first access node to the second access node when the handoff timer expires.

11. The communication system of claim 10, wherein the first access node is further configured to process the loading factor of the first access node, the loading factor of the second access node, the mobility factor, and the application type to determine a handoff timer duration and the handoff timer expires when the handoff timer duration has elapsed.

12. The communication system of claim 11, wherein the first access node is further configured to process a service level agreement of the wireless communication device to determine the handoff timer duration.

13. The communication system of claim 10, comprising:
the wireless communication device, wherein
the wireless communication device is configured to wirelessly transfer an indicator of the signal strength levels at the wireless communication device for wireless communications transferred from each of the first access node and the second access node to the first access node, and
the first access node is further configured to receive the indicator of the signal strength levels, determine the difference between the signal strength levels, and determine when the difference between the signal strength levels reaches the handoff threshold.

14. The communication system of claim 10, wherein the first access node is further configured to estimate the signal strength levels at the wireless communication device for the wireless communications transferred from each of the first access node and the second access node.

15. The communication system of claim 10, wherein the loading factor of the first access node and the loading factor of the second access node each comprise a quantity of other wireless communication devices associated with each of the first access node and the second access node.

16. The communication system of claim 10, wherein the loading factor of the first access node and the loading factor of the second access node each comprise a traffic level of user communications of other wireless communication devices associated with each of the first access node and the second access node.

17. The communication system of claim 10, wherein the mobility factor of the wireless communication device comprises a rate of change of a location of the wireless communication device.

18. The communication system of claim 10, wherein the first access node is further configured to transfer an indicator of the handoff to the second access node and the second access node is configured to receive the indicator of the handoff and initiating further user communications between the wireless communication device and the second access node upon receiving the indicator of the handoff.

* * * * *